July 3, 1928.
H. HOWARD
1,675,491
PROCESS OF MAKING SODIUM HYDROSULPHIDE
Filed July 20, 1925
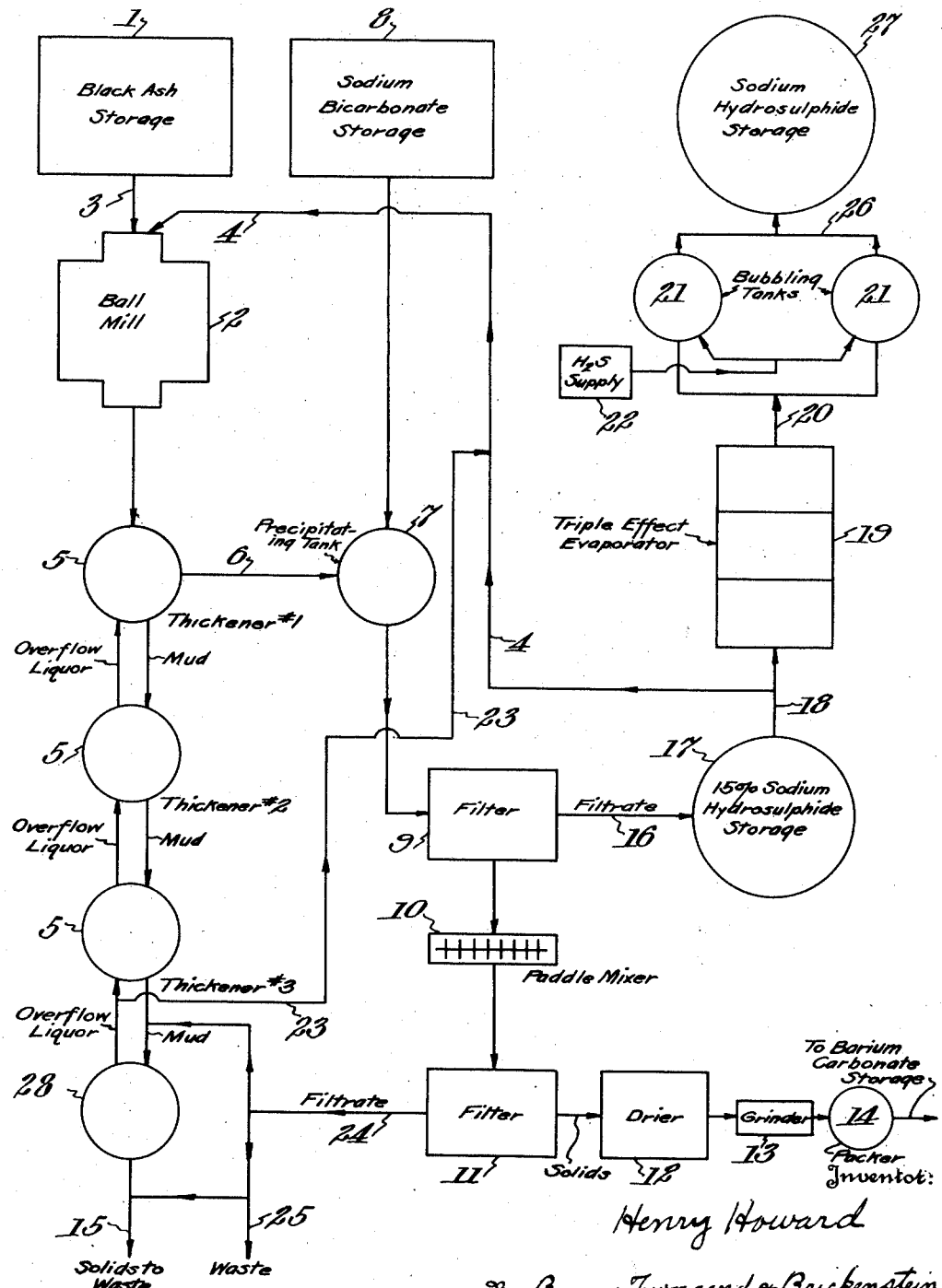

Patented July 3, 1928.

1,675,491

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING SODIUM HYDROSULPHIDE.

Application filed July 20, 1925. Serial No. 44,913.

Prior methods for the production of sodium hydrosulphide by the interaction of sodium bicarbonate with an alkaline earth metal sulphide have the serious disadvantage that the solutions of sodium hydrosulphide directly obtained, for instance by leaching barium sulphide black ash with water and treating the resulting solution with sodium bicarbonate average less than 6% NaHS and must be concentrated by evaporation up to a shipping strength of about 35% NaHS. This concentrating operation is expensive on account of the large amount of water to be evaporated and also results in a more or less extensive decomposition of the hydrosulphide with loss of hydrogen sulphide. Another method for the production of sodium hydrosulphide by treating sodium sulphide with hydrogen sulphide is reasonably economical if a cheap supply of hydrogen sulphide is available but this method is dangerous to the workmen on account of the very poisonous nature of the hydrogen sulphide.

The process of the present invention avoids to a large extent the disadvantages of these prior processes and involves generally a building up of the sodium hydrosulphide content of a solution without evaporation.

The invention will be described and illustrated hereinafter in connection with the production of sodium hydrosulphide by the interaction of sodium bicarbonate and barium sulphide it being understood however that the invention is not limited in this respect, excepting as may be required by the claims. In place of barium sulphide, other metal sulphides capable of forming insoluble carbonates as calcium sulphide, and other metal bicarbonates capable of forming hydrosulphides such as potassium and ammonium bicarbonate may be used.

My process generally is as follows:—

Barium sulphide black ash is leached with a solution of sodium hydrosulphide from a previous operation and the resulting solution of sodium hydrosulphide and barium sulphide is separated from carbon and other insoluble material contained in the black ash and treated with sodium bicarbonate. The resulting barium carbonate precipitate is separated and the sodium hydrosulphide solution is divided into two parts, one of which is concentrated by evaporation to the desired strength, say 35% NaHS, while the other part is returned to the black ash leaching operation. The concentrated sodium hydrosulphide solution so obtained due to the loss of hydrogen sulphide during the evaporation and the imperfection of the reaction

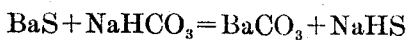
$$BaS + NaHCO_3 = BaCO_3 + NaHS$$

is deficient in hydrogen sulphide to an extent of about 10% and is finished by treatment with hydrogen sulphide. By operating in this manner a solution containing 15% or more of NaHS may be obtained directly so that the evaporation and hydrogen sulphide requirements of the process are very materially reduced with a corresponding reduction in the cost of the final product and in the danger incident to the use of hydrogen sulphide.

In order that the practice of my invention may be clearly understood, the following detailed description of a suitable procedure is given, taken in connection with the appended drawing which is a flow sheet representing one embodiment of the invention:

Black ash from a suitable source of supply 1 and a solution containing about 15% of NaHS produced as described hereinafter are delivered into a ball mill 2 through conduits 3 and 4, respectively. The resulting slurry is passed to a Dorr thickener apparatus 5,—comprising thickener units #1, #2 and #3,—and the separated solution, having a gravity of about 23° Bé. and containing about 15% NaHS and 8% BaS, is delivered through conduit 6 into a precipitating tank 7, into which is delivered also sodium bicarbonate in solid form from storage 8. The resulting mixture of barium carbonate precipitate and sodium hydrosulphide solution is filtered in filter 9 and the barium carbonate is re-slurried with water in mixer 10, filtered in filter 11, dried in drier 12, ground in grinder 13, and packaged in packer 14 for sale. The barium carbonate washings, delivered through conduit 24, may be used in place of water to wash the black ash residue produced by the separation of the slurry formed by the ball mill in the Dorr thickener apparatus 5 as described above, or they may be discharged to waste through conduit 25. This washing of the black ash residue preferably is carried out in the Dorr thickener apparatus 28 through which the washing liquid and the residue pass in countercurrent. The washed residue is discharged through conduit 15 to waste and the washings, having a gravity of about 10° Bé. and containing about 5% NaHS, may be delivered into the thickener apparatus 5 or they may in part be delivered by conduit 23 into the sodium hydrosulphide solution in conduit 4, used for leaching fresh black ash.

The solution of sodium hydrosulphide, after having been separated from the barium carbonate precipitate in filter 9 and transferred to storage 17, is divided into two parts, one part amounting to about 20% of the whole being delivered through conduit 18 to evaporators 19 where it is concentrated up to the equivalent of about 35% NaHS, then delivered through conduit 20 to bubbling tanks 21 and therein treated with hydrogen sulphide gas delivered from the source of supply 22. The concentrated sodium hydrosulphide solution, after treatment with hydrogen sulphide in the bubbling tanks 21, is transferred, through conduit 26, to the sodium hydrosulphide storage 27. The other part of the sodium hydrosulphide solution, delivered through conduit 4, is mixed with the black ash residue washings delivered through conduit 23 from the thickener apparatus 28, forming a solution containing about 15% NaHS which is delivered into the ball mill 2 as described above.

As will be apparent, the specific details of the procedure described above may be considerably varied without departure from my invention, the principal feature of which is the use of a portion of the sodium hydrosulphide product of one cycle of the procedure as the leaching liquid for the black ash in a succeeding cycle of the procedure.

I claim:—

1. Process of making an alkali metal hydrosulphide which comprises dissolving an alkaline earth metal sulphide in a solution containing an alkali metal hydrosulphide and treating the resulting solution with an alkali metal bicarbonate.

2. Process of making an alkali metal hydrosulphide which comprises dissolving an alkaline earth metal sulphide in a solution of an alkali metal hydrosulphide, treating the resulting solution with an alkali metal bicarbonate, dividing the resulting solution of alkali metal hydrosulphide into two parts and using one of said parts for dissolving a further quantity of metal sulphide in a repetition of the procedure.

3. Process of making sodium hydrosulphide which comprises leaching barium sulphide black ash with a solution containing sodium hydrosulphide produced in a previous operation, separating the resulting solution from insoluble material, treating the separated solution with sodium bicarbonate, separating barium carbonate from the resulting reaction mixture, dividing the separated solution into two parts and using one of said parts for leaching black ash in a repetition of the procedure.

4. Process of making sodium hydrosulphide which comprises dissolving barium sulphide in a solution of sodium hydrosulphide and treating the resulting solution with sodium bicarbonate.

5. Process of making a concentrated solution of an alkali metal hydrosulphide which comprises dissolving an alkaline earth metal sulphide in a solution of an alkali metal hydrosulphide, treating the resulting solution with an alkali metal bicarbonate, dividing the resulting solution into two parts, concentrating one of said parts by evaporation and contacting the concentrated solution with hydrogen sulphide.

In testimony whereof, I affix my signature.

HENRY HOWARD.